US005824408A

United States Patent [19]

Kume et al.

[11] Patent Number: 5,824,408

[45] Date of Patent: Oct. 20, 1998

[54] WHITE ELECTROCONDUCTIVE COATING COMPOSITION AND TRANSFER MATERIAL-CARRYING MEMBER

[75] Inventors: Akiya Kume, Kawasaki; Yoshiaki Nishimura, Tokyo; Jun Murata, Kawagoe; Nobutoshi Hayashi, Machida; Yukinori Nagata; Hiroshi Mayuzumi, both of Yokohama, all of Japan

[73] Assignee: Canon Kabushiki Kaisha, Tokyo, Japan

[21] Appl. No.: 638,188

[22] Filed: Apr. 26, 1996

[30] Foreign Application Priority Data

Apr. 28, 1995 [JP] Japan .................................... 7-105511

[51] Int. Cl.[6] ..................................................... B32B 05/16

[52] U.S. Cl. .......................... 428/323; 428/328; 428/409; 428/411.1; 428/195; 428/206

[58] Field of Search ............................ 427/212; 428/195, 428/411.1, 688, 323, 328, 409, 206; 399/302, 308, 313

[56] References Cited

U.S. PATENT DOCUMENTS

| | | | |
|---|---|---|---|
| 4,373,013 | 2/1983 | Yoshizumi | 428/570 |
| 4,904,636 | 2/1990 | Hayashi et al. | 503/207 |
| 4,943,819 | 7/1990 | Toma et al. | 346/160.1 |
| 5,087,517 | 2/1992 | Sagawa et al. | 428/329 |
| 5,258,783 | 11/1993 | Sasanuma et al . | |
| 5,534,193 | 7/1996 | Jacobson | 252/518 |

FOREIGN PATENT DOCUMENTS

| | | |
|---|---|---|
| 0 519 710 | 12/1992 | European Pat. Off. . |
| 0 604 941 | 7/1994 | European Pat. Off. . |
| 0 630 950 | 12/1994 | European Pat. Off. . |
| 0 740 221 | 10/1996 | European Pat. Off. . |
| 7-77856 | 3/1995 | Japan . |

OTHER PUBLICATIONS

Patent Abstracts of Japan, vol. 012, No. 033 (C–472), Jan. 30, 1988, & JP–62–181371 (Seiko Kasei KK), Aug. 8, 1987.

Patent Abstracts of Japan, vol. 013, No. 101 (C–574), Mar. 9, 1989, & JP–63–275681 (Kawakami Toryo KK), Nov. 14, 1988.

Patent Abstracts of Japan, vol. 017, No. 653 (E–1469), Dec. 3, 1993, & JP–05–217417 (Otsuka Chem. Co., Ltd.), Aug. 27, 1993.

Database WPI, Week 9441, Derwent Publications Ltd., London, GB, AN 94–330312 XP002027977 & JP–06–256691 (Kansai Paint Co., Ltd.), Sep. 13, 1994.

*Primary Examiner*—Marie Yamnitzky

*Attorney, Agent, or Firm*—Fitzpatrick, Cella, Harper & Scinto

[57] ABSTRACT

A white electroconductive coating composition includes a white pigment having a whiteness of at least 60, a white conductive material having a whiteness of at least 50 and a volume resistivity of at most $1\times10^{10}$ohm.cm. The coating composition is suitable to provide a a coating film showing a whiteness of at least 60 and a surface resistivity of at most $1\times10^{11}$ ohm/cm$^2$. Such a white conductive layer may be formed on a back side of a surface insulating film of a transfer material carrying member of an electrophotographic image forming apparatus to provide a reference white pattern for detecting a density of a toner image formed on the carrying member, thereby allowing controlled image formation based on the detected density data.

5 Claims, 1 Drawing Sheet

WHITE ELECTROCONDUCTIVE COATING COMPOSITION AND TRANSFER MATERIAL-CARRYING MEMBER

FIELD OF THE INVENTION AND RELATED ART

The present invention relates to a white (electro-) conductive coating composition, particularly one suitable for providing a transfer material carrying member allowing a toner density detection in a color electrophotographic process.

Hitherto, a white conductive coating composition has been prepared by dispersing a white electroconductive material in a resinous binder or by dispersing a colorless ionically electroconductive material in a white paint.

In an electrophotographic process, toner density control has been effected by placing a toner on an image-bearing member (such as a photosensitive drum) and detecting the density thereof (Japanese Laid-Open Patent Application (JP-A) 7-77856). However, because of the demand for a higher image quality, particularly that of a full-color image, and also for a smaller size image forming apparatus, and since the density detection system occupies a relatively, large space, a more efficient system is desired.

For the above reason, in an image forming apparatus wherein a toner image is transferred onto a transfer(-receiving) material, such as paper, carried on a transfer material carrying member, it has been proposed to form a toner pattern (patch) for toner density measurement on the transfer material carrying member and include a density detection means for detecting the toner density and a control means for controlling the image density level depending on the detected toner density (Japanese Patent Application No. 7-463265). For the above purpose, a white electroconductive layer giving a sufficient contrast with the toner pattern is required to be formed on the transfer material carrying member below a surface insulating layer.

The white conductive layer is required to have an electroconductivity in addition to the high degree of whiteness for providing a sufficient contrast with the toner pattern. More specifically, in case where the transfer material carrying member is in the form of a film, at least a surface layer of which is insulating, a white conductive layer formed on the back side of the film is required to discharge the surface charged during transfer of a toner image transfer onto a transfer material carried on the film. On the other hand, in case where a white conductive, layer is disposed between an electroconductive support and a transparent insulating surface layer formed thereon, the white conductive layer is required to have an electroconductivity so that a voltage applied to the electroconductive support for transferring a toner image onto a transfer material carried on the transfer material carrying member is not interrupted by the white conductive layer.

In addition to the above, the white conductive layer is also required be in intimate contact with the film, have a flexibility durable against bending, and a stability and a durability against environmental change. Further, the white conductive layer is expected to exhibit wear resistance in the case where it is formed in an exposed state on the back side of a film-form transfer material-carrying member, and also in the case where it is applied securely onto one of the electroconductive or the surface (layer-forming) film, and a frictional force can be applied between the support and the surface film.

A white conductive material generally comprising an electroconductivity-imparted metal oxide contained in such a white conductive layer is not however pure white but shows a pale gray or gray tint. As a result, if only such a white conductive material is dispersed in a resinous binder, the resultant layer may have a conductivity but cannot acquire a whiteness of at least 60.

Further, as a white pigment generally has a high resistivity, a layer obtained by dispersing only such a white pigment in a resinous binder may have a sufficient whiteness but cannot have a sufficient conductivity as represented by a surface resistivity of at most $1\times10^{11}$ ohm/□, thus failing to satisfy both of the required whiteness and electroconductivity.

On the other hand, a layer obtained by using an ionically conductive material has a difficulty that its resistivity is liable to be remarkably changed due to a change in environmental condition, such as humidity.

SUMMARY OF THE INVENTION

Accordingly, an object of the present invention is to provide a white conductive coating composition capable of providing a white conductive layer having satisfactory whiteness and electroconductivity in combination.

Another object of the present invention is to provide a transfer material carrying member and an electrophotographic image forming apparatus obtained by using such a white conductive coating composition.

According to the present invention, there is provided a white electroconductive coating composition, comprising a white pigment having a whiteness of at least 60, a white conductive material having a whiteness of at least 50 and a volume resistivity of at most $1\times10^{10}$ ohm.cm, and a binder; said coating composition providing a coating film showing a whiteness of at least 60 and a surface resistivity of at most $1\times10^{11}$ ohm/□.

According to another aspect of the present invention, there is provided a transfer material-carrying member comprising a support and a white electroconductive coating layer formed on the support;

wherein said white electroconductive coating layer comprises a white pigment having a whiteness of at least 60, a white conductive material having a whiteness of at least 50 and a volume resistivity of at most $1\times10^{10}$ ohm.cm, and a binder; and exhibits a whiteness of at least 60 and a surface resistivity of at most $1\times10^{11}$ ohm/□.

According to a further aspect of the present invention, there is provided an electrophotographic image forming apparatus, comprising: a transfer material-carrying member having a white electroconductive layer and functioning to carry a transfer material to which a toner image formed on an image-bearing member is transferred, a density detection means for forming a toner pattern for toner density detection and detecting a density of the toner pattern as a contrast with the white electroconductive layer of the transfer material-carrying member, and control means for controlling an image density based on an output of the density detection means;

wherein said white electroconductive coating layer of the transfer material carrying member comprises a white pigment having a whiteness of at least 60, a white conductive material having a whiteness of at least 50 and a volume resistivity of at most $1\times10^{10}$ ohm.cm, and a binder; and exhibits a whiteness of at least 60 and a surface resistivity of at most $1\times10^{11}$ ohm/□.

The white conductive coating composition according to the present invention may be provided with a high whiteness and a sufficient electroconductivity by containing both a white pigment having a whiteness of at least 60, and a white conductive material having a whiteness of at least 50 and an electrical resistivity (volume resistivity) of at most $1\times10^{10}$ ohm.cm.

A white colorant for providing a high whiteness may include a white dye and a white pigment. In the present invention, a white pigment is used because of a high hiding power not affected by the color of a lower layer.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
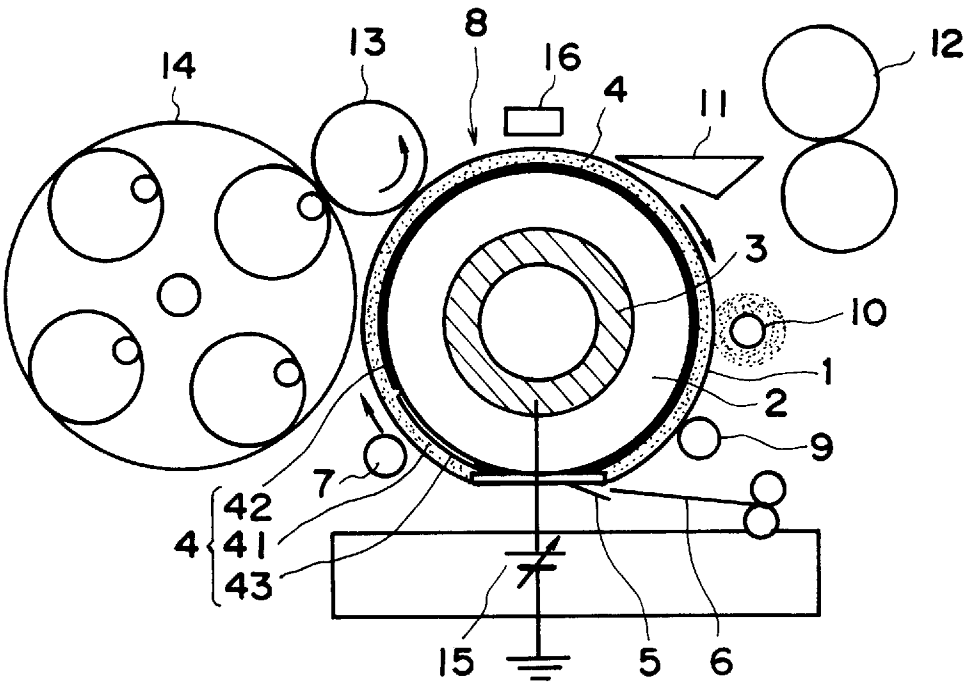
FIG. 1 is an illustration of an electrophotographic image forming apparatus equipped with a transfer material carrying member formed by using a white conductive coating composition according to the invention.

Examples of the white pigment may include: non-conductive titanium oxide ($TiO_2$, sometimes called "titanium white"), magnesium oxide (MgO), zinc white (ZnO), lead white ($2PbCO_3 \cdot Pb(OH)_2$), lithopone (mixture crystal of zinc sulfide and barium sulfate), and zinc sulfide (ZnS). Among these, non-conductive titanium oxide (titanium white) is particularly preferred in view of a high whiteness and a high hiding power. Non-conductive white titanium oxide has an electrical resistivity (volume resistivity) higher by two or more digits than that of a white conductive material used in the present invention.

Examples of the white conductive material may include metal powder, electroconductive titanium oxide, metal oxides such as tin oxide and zinc oxide, and appropriate sizes of particles surface-coated with an electroconductive material, such as tin oxide, antimony oxide, indium oxide, molybdenum oxide, zinc, aluminum, gold, silver, iron, copper, chromium, cobalt, lead, platinum, and rhodium. Among these, it is particularly preferred to use white conductive titanium oxide comprising acicular titanium oxide surface-coated with tin oxide-based conductive layer.

The white conductive titanium oxide may include one having a rutile-type crystal structure and one having an anatase-type crystal structure. The anatase-type one is liable to cause choking when included in a paint, so that rutile-type white conductive titanium oxide is preferred.

Regarding the particle shape, the white conductive titanium oxide may be spherical or acicular. The acicular one may form a structure in a binder to provide a conductivity in a smaller amount further exhibits high hiding powder and provides a high coating film strength, so that acicular conductive titanium oxide is preferred.

The white pigment and the white conductive material may be dispersed in a resinous binder, examples of which may include polymeric materials, inclusive of polyurethane; acrylic resins, such as polymethyl methacrylate, and polybutyl methacrylate, polyvinyl butyral, polyvinyl acetal, polyallylate, polycarbonate, polyester, phenoxy resin, polyvinyl acetate, polyamide, polyvinylpyridine, cellulosic resins; rubbers, such as EPDM (ethylene-propylenediene terpolymer), polybutadiene, natural rubber, polyisoprene, SBR (styrene-butadiene rubber), CR (chloroprene rubber), NBR (nitrile-butadiene rubber), silicone rubber, urethane rubber, and epichlorohydrin rubber; RB (butadiene resin), styrene-based resins, such as SBS (styrene-butadiene-styrene elastomer) and styrene-vinyl acetate copolymer); polyesters, polyolefins, such as PE (polyethylene) and PP (polypropylene), PVC (polyvinyl chloride), and butadiene-acrylonitrile copolymer.

In the case of providing a transfer material-carrying member in the form of a film in an electrophotographic image forming apparatus, it is particularly preferred to use a polyester resin which is excellent in intimate contact, flexibility, stability against an environmental change, durability, wear resistance, yellowing resistance, and colorlessness.

The whiteness is a property proportional to a reflectance of incident light, so that a whiteness of 100 corresponds to a reference of 100%, and a whiteness of 50 corresponds to a reflectance of 50%.

A higher whiteness may be obtained at a higher white pigment content, and a lower electrical resistivity may be obtained at a higher white conductive material content. However, if the white conductive coating composition contains too much filler (the white pigment and the white conductive material, and optional fillers, if any), the film-forming property of the coating composition can be impaired to make difficult the coating film formation by printing. Further, when the white conductive coating layer is formed on a plastic film, the resultant coated film is liable to have a lower flexibility and the intimate adhesion of the coating layer can be impaired. For the above reason, the white conductive coating composition may preferably contain 40–50 wt. % of the white pigment and 15–25 wt. % of the white conductive material together with the binder resin constituting basically the remaining amount of the coating composition. By using a white pigment having a whiteness of at least 60, preferably at least 70, and a white conductive material having a whiteness of at least 50, preferably at least 55, and a volume resistivity of at most $1\times10^{10}$ ohm.cm, preferably at most $8\times10^{9}$ ohm.cm, together with an appropriate binder, it is possible to provide a white conductive coating composition capable of providing a coating film showing a sufficient whiteness of at least 60 and a sufficient conductivity as represented by a surface resistivity of at most $1\times10^{11}$ ohm/□, when measured at a coating layer thickness of at least 5 $\mu$m.

The whiteness of a white pigment and a white electroconductive material referred to herein are based on values measured with respect a coating film of at least 5 $\mu$m in thickness formed by applying a composition obtained by dispersing the white pigment or the white electroconductive material in an appropriate binder resin of, e.g., polyester resin, at a filler concentration of, e.g., 65 wt. %, of the resultant coating film.

The volume resistivity values of white conductive materials referred herein are based on values measured by charging 10 g of a sample material in an insulating cylindrical cell (of e.g., alumina) having an inner diameter of 25 mm and measuring an electrical resistance of the sample under compression at a pressure of 100 kg/$cm^2$ and application of a voltage of 100 volts across the sample height.

The white conductive coating composition according to the present invention basically comprises the above-mentioned white pigment, white conductive material and binder, but can contain other optional additives, such as anti-oxidant, ultraviolet absorber, etc. In preparation for the application or printing, the coating composition according to the present invention may preferably assume a coating liquid (paint) form by dispersing the above components in a liquid medium.

Examples of the liquid medium may include: water; alcohols, such as methanol and butanol; ketones, such as acetone and methyl ethyl ketone; esters, such as butyl acetate; aromatic hydrocarbons, such as benzene and xylene; solvent naphtha and terpene oil. These liquid media may be used alone or in mixture of two or more species. The solid matter (filler an binder resin) may preferably be dispersed in an amount of 50–150 wt. parts per 100 wt. parts of the liquid medium.

FIG. 1 shows an embodiment of image forming apparatus equipped with a transfer material-carrying member formed by using a white conductive coating composition according to the present invention.

Referring to FIG. 1, the image forming apparatus includes a transfer drum 8 (as a transfer material-carrying member) which in turn includes a metal cylinder (aluminum cylinder) 1 to which a transfer bias (voltage) is applied, a continuous foam sponge layer 2 applied about the metal cylinder 1 with an electroconductive adhesive 3, and a surface sheet 4 wound about the sponge layer 2 so as to be fixed at its both ends by a holding plate 17 which in turn is screwed to the metal cylinder 1. The surface sheet 4 includes a transparent base PVdF film 41 having a thickness of, e.g., ca. 75 μm, and a conductive black coating layer 42 and a conductive white coating layer 43, respectively screen-printed on the PVdF film 41. The conductive white coating layer 43 is formed in a thickness of, e.g., ca. 5–30 μm with the white conductive coating composition according to the present invention. The conductive black coating layer 42 may be formed in a similar thickness with a conventional black conductive paint containing, e.g., electroconductive carbon. The transfer drum 8 is further provided with a gripper 5 for gripping an leading end of a transfer material 6. The image forming apparatus further includes an attachment roller 7 for electrostatically attaching the transfer material 6 to the transfer drum 8, a charge-removing roller 9 for charge-removing the transfer drum surface after completion of the transfer, a fur brush 10 for cleaning the transfer drum surface, and a separation claw 11 for separating the transfer material, in association with the transfer drum 8. The image forming apparatus further includes fixing rollers 8 for fixing the toner image onto the transfer material, a photosensitive drum 13, and a rotary unit-type developing device 14 including toner cartridges of four colors (magenta, yellow, cyan and black). In operation, an electrostatic latent image corresponding to magenta color is formed on the photosensitive drum 13 by scanning with semiconductor laser light are developed with magenta toner supplied from the developing device 14 to form a magenta toner image on the drum 13. Along with the rotation in the directions of allows, a transfer paper (transfer material) 6 is gripped at its leading end with the gripper 5 and conveyed in the arrow direction to reach a position of contact with the photosensitive drum 13, where the magenta toner image on the photosensitive drum is electrostatically transferred to be attached to the transfer paper under the application of a transfer bias by a transfer bias application means 15. Similar operations are repeated for other three colors of cyan, yellow and black. After four turns of the transfer drum 8 to complete the respective color transfer steps, the transfer paper carrying the superposed toner images is caught at its leading end by the separation nail 11 and transferred and passed through the fixing rollers to form a fixed full color image thereon. Thus, a series of image-forming steps are completed.

As a preliminary step before starting the above-mentioned steps, it is important to check a color density balance in full-color image formation. For this purpose, respective color toner patterns each in a size of ca. 10 mm-square are formed on the transfer drum (i.e., PVdF film not carrying a transfer paper) to detect the densities thereof by a sensor 16 and variably control the toner quantity at an appropriate level by controlling, e.g., the developing bias or the latent image formation potential based on the detected densities.

Figure 2:
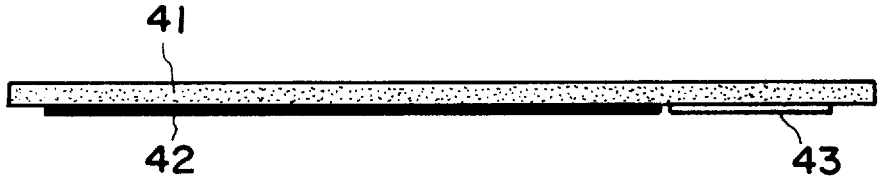
FIG. 2 is a side view of an embodiment of an insulating film having thereon a white conductive layer formed by using the white conductive coating composition according to the invention constituting a transfer material carrying member by itself or constituting a surface layer of a transfer material-carrying member.

It is of course possible to detect densities of both chromatic (magenta, cyan and yellow) toner patterns and non-chromatic black color toner pattern by differences in reflectance of visible rays from that of the white conductive layer. However, in case of using infrared light as density detection light, a black conductive layer, if formed, provides a larger contrast of reflectance with the chromatic toner patterns. Accordingly, in the case of using infrared light as detection light, it is preferred to use a transfer material-carrying member having both a white conductive layer and a black conductive layer. Such a transfer material-carrying member is already included in an image forming apparatus shown in FIG. 1 as a surface sheet 4 including a substrate PVdF film 41 on which a black conductive layer 42 and a white conductive layer 43 are formed. FIG. 2 shows an enlarged side view of such a surface sheet or transfer material-carrying member 4 having a black conductive layer 42 and a white conductive layer 43 in an extended form, and FIG. 3 illustrates a manner of density detection by using such a transfer material-carrying member or surface sheet 4.

Even in the case of using infrared light for density detection, it is effective to form a white conductive layer having a whiteness of at least 60, which corresponds to a high reflectance of at least 75% for infrared light having a wavelength region of 700–1500 nm. Further, in the case of a transparent film having a white conductive layer formed on the back side thereof or a white conductive layer formed between a transparent insulating layer and an electroconductive support, if the transparent film or layer is soiled, the accuracy of density detection is lowered. A high whiteness of the white conductive layer is also effective for evaluating the soiling of the transparent film or layer thereon to keep the high detection accuracy by clearing the surface when necessary even in the case of using infrared light for density detection.

Figure 3:
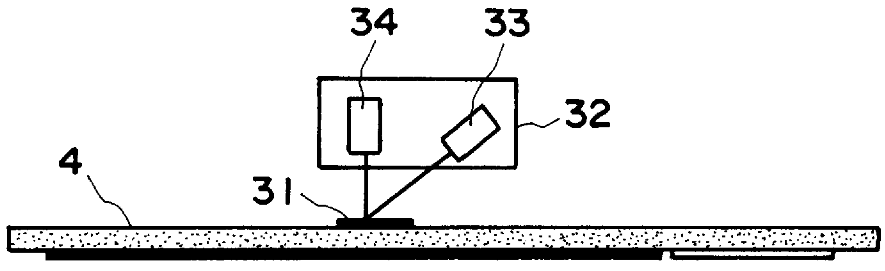
FIG. 3 is an illustration of toner density detection principle.

FIG. 3 illustrates a manner of detecting the density of a toner pattern 31 formed on such a surface sheet or transfer material-carrying member 4. The density of the toner pattern 31 is detected by a detection sensor 32 including a light emission device emitting infrared light incident to the toner pattern 31 at an angle of 45 deg. and reflected light therefrom is detected by a photosensor 34.

Referring back to FIG. 2, the surface film or transfer material-carrying member 4 comprises a base film 41 of, e.g., PVdF, and a black conductive layer 42 and a white conductive layer 43, respectively, formed thereon by screen printing.

On a region of the base film 41 back-printed with the black conductive layer 42, three color (magenta, cyan and yellow) toner patterns are formed to provide a good contrast with the black layer 42. A black toner pattern is formed on a region of the base film 41 back-printed with the white conductive layer 43 so as to provide a good contrast with the white conductive layer. More specifically, in the case of three chromatic toner patterns, a higher toner density provides a larger reflectance of infrared light to provide a larger difference in reflectance from that by the black conductive layer 42. On the other hand, in the case of a black toner pattern, a higher toner density provides a smaller reflectance of infrared light to result in a larger difference in reflectance from that by the white conductive layer 43. Based on such reflectance differences (contrast), the toner pattern densities are detected. Accordingly, the white conductive layer may preferably exhibit a higher reflectance of infrared light, more preferably at least 75%, more preferably at most 85%. The reflectance of infrared light may suitably be measured by a spectral reflectance meter ("U-3400", available from Hitachi Seisakusho K.K.).

The base film 41 may basically comprise any transparent insulating film, a preferred example of which is a PVdF film of, e.g., 75 μm in thickness (generally 25–300 μm). The black conductive layer 42 and the white composition layer 43 may be formed in a thickness of, e.g., at most 30 μm in thickness (preferably 5–30 μm), respectively, e.g., by screen printing, so as to provide a surface resistivity of at most $1\times10^{11}$ ohm/□.

Toner patterns successively formed on a photosensitive drum 13 (FIG. 1) are successively transferred by applying an appropriate transfer bias to the conductive layers 42 and 43 onto the surface sheet 4 of the transfer drum 8 to form uniform toner patterns free from density irregularities.

As a result, a density detection means occupying only a small space is constituted to provide a full-color image forming apparatus capable of providing clear full-color images having a good color balance.

EXAMPLE 1

30 wt. parts of MgO powder (white pigment) (Dav (average particle size)=0.3 μm, W (whiteness)=70), and 30 wt. parts of white conductive potassium titanate whisker (white conductive material) (Lav (average fiber length)=10 μm, W=55, VR (volume resistivity)=$8\times10^{9}$ ohm.cm) were mixed with 40 wt. parts of NBR latex (solid matter content=48.7%, in water), and the mixture was subjected to dispersion in a sand mill ("4TSG", available from AIMEX Co.). The resultant paint composition was applied by a wire bar onto a 75 μm-thick PVdF (polyvinylidene fluoride) film, followed by drying in air and drying in an oven at 60° C. for 30 min. to form a white coating layer having a dry thickness of 21.5 μm. The coating layer showed a whiteness of 62 (as measured by using a densitometer ("TC-6DS", available from Tokyo Denshoku K.K.) together with a green filter (transmission wavelength range=460–600 nm, and a maximum transmission wavelength=535 nm)) and a spectral reflectance of 90% or higher for infrared rays at a wavelength of 950 nm. The coating layer further showed a surface resistivity of $8\times10^{10}$ ohm/□ (as measured by using a high resistance meter ("Hiresta-IP" with a "HR-100 Probe", available from Mitsubishi Yuka K.K.) at 1 min. under application of 10 volts).

The composition and the measured data are inclusively shown in Table 1 appearing hereinafter.

EXAMPLE 2

A coating composition was prepared, and a coating layer was formed therefrom and evaluated, in the same manner as in Example 1 except that the white pigment was replaced by 30 wt. parts of white titanium oxide powder (Dav=0.25 μm, W=92).

The results are also shown in Table 1.

EXAMPLE 3

A coating composition was prepared, and a coating layer was formed therefrom and evaluated, in the same manner as in Example 1 except that the white pigment was replaced by 40 wt. parts of the white titanium oxide powder used in Example 1 and the white conductive material was replaced by 20 wt. parts of spherical titanium oxide powder (Dav=0.25 μm, W=57, VR=$3\times10^{2}$ ohm.cm).

The results are also shown in Table 1.

EXAMPLE 4

A coating composition was prepared, and a coating layer was formed therefrom and evaluated, in the same manner as in Example 3 except, that the white conductive material was replaced by 20 wt. parts of electroconductive acicular titanium oxide powder (Lav=2.9 μm, W=59 and VR=$5\times10^{2}$ ohm.cm).

The results are also shown in Table 1.

EXAMPLE 5

A coating composition was prepared, and a coating layer was formed therefrom and evaluated, in the same manner as in Example 4 except that the NBR latex was replaced by 40 wt. parts of polyester resin vehicle (solid matter content=30 wt. % in a mixture solvent of ketone/polyhydric alcohol/aromatic hydrocarbon (5/1/1 by weight)).

The results are also shown in Table 1.

COMPARATIVE EXAMPLE 1

A coating composition was prepared, and a coating layer was formed therefrom and evaluated, in the same manner as in Example 5 except that the white conductive material was omitted and the white titanium oxide powder (white pigment) was increased to 60 wt. parts.

The results are also shown in Table 1.

COMPARATIVE EXAMPLE 2

A coating composition was prepared, and a coating layer was formed therefrom and evaluated, in the same manner as in Example 5 except that the white pigment was omitted and the electroconductive acicular titanium oxide powder (white conductive material) was increased to 60 wt. parts.

The results are also shown in Table 1.

COMPARATIVE EXAMPLE 3

A coating composition was prepared, and a coating layer was formed therefrom and evaluated, in the same manner as in Comparative Example 1 except that 1 wt. part of carbon (as colorant) was further added.

The results thereof are shown in Table 1 below together with other Examples and Comparative Examples.

TABLE 1

Coating composition and Evaluation results

| | Example | | | | | Comparative Example | | |
|---|---|---|---|---|---|---|---|---|
| | 1 | 2 | 3 | 4 | 5 | 1 | 2 | 3 |
| COATING COMPOSITION (wt. %) | | | | | | | | |
| White pigment | | | | | | | | |
| MgO | 30 | | | | | | | |
| Titanium oxide | | 30 | 40 | 40 | 40 | 60 | | 60 |
| (Carbon) | | | | | | | | 1 |
| White conductive material | | | | | | | | |
| Potassium titanate | 30 | 30 | | | | | | |
| Spherical $TiO_2$ | | | 20 | | | | | |
| Acicular $TiO_2$ | | | | 20 | 20 | | 60 | |
| Binder | | | | | | | | |
| NBR | 40 | 40 | 40 | 40 | | | | |
| Polyester | | | | | 40 | 40 | 40 | 39 |
| EVALUATION RESULTS | | | | | | | | |
| Whiteness | 62 | 66 | 68 | 72 | 73 | 89 | 57 | 45 |
| Refectance at 950 nm (%) | ≧90 | ≧90 | ≧90 | ≧90 | ≧90 | ≧95 | 60–70 | 40–50 |
| Surface resistivity | $8 \times 10^{10}$ | $7 \times 10^{10}$ | $3 \times 10^{9}$ | $6 \times 10^{8}$ | $5 \times 10^{8}$ | $3 \times 10^{2}$ | $8 \times 10^{6}$ | $2 \times 10^{12}$ |

Each of the above-prepared transparent PVdF films 41 having thereon a white conductive coating layer 43 was used to form a transfer drum 8, and the transfer drum 8 was incorporated in a full-color electrophotographic image forming apparatus as shown in FIG. 1 to evaluate the density detection performance for a black toner image by using infrared light having a principal wavelength at 950 nm.

In the image forming apparatus, first a photosensitive drum 13 was primarily surface-charged to a voltage of ca. −700 volts via a charger supplied with a DC voltage of −700 volts superposed with an AC voltage of a frequency of 700 Hz and a Vpp (peak-to-peak voltage) of 1500 volts. Then, the photosensitive drum 13 was exposed to a laser beam emitted from a laser diode supplied with a signal of a black toner pattern (1 cm×1 cm) to form a corresponding electrostatic latent image on the photosensitive drum 13. The latent image on the photosensitive drum 13 was developed with a black toner supported from the developing device 14, and the resultant black toner pattern was then transferred to the transfer drum 8 under the action of a transfer voltage of 1000 volts applied between the transfer drum 8 and the photosensitive drum 13.

The black toner pattern thus formed on the transfer drum 8 (the surface sheet 4) thereof on a region back-printed with the white conductive layer 43 was subjected to density detection in the manner as described with reference to FIG. 3.

As a result, the surface sheets of Examples 1 to 5 each having a white conductive layer having a whiteness of at least 60 and a surface resistivity of at most $1\times10^{11}$ ohm/□ ensured a potential difference between white and black of at least 5 volts because of a sufficiently high whiteness giving a sufficient contrast with the black toner pattern, thus allowing 256 gradation levels by voltage division. Further, as each surface sheet was back-printed with a white conductive layer having a sufficiently low surface resistivity, the surface potential thereof after charge removal by the charge-removing roller 9 was lowered to below −100 volts.

In contrast thereto, the surface sheet (film) obtained by Comparative Example 1 back-printed with a white conductive layer having a surface resistivity exceeding $1\times10^{11}$ ohm/□ caused a difficulty in charge removal and resulted in a residual potential of −450 volts, so that a normal primary charge for subsequent image formation was not provided.

On the other hand, the surface sheet (film) of Comparative Example 2 back-printed with a white conductive layer having a whiteness of 57 provided a black-white potential difference of only 4.3 volts, which was insufficient to provide 256 gradation levels required for high-quality electrophotographic image formation.

Further, the surface sheet (film) of Comparative Example 3 back-printed with a white conductive layer having a whiteness of 45 and a surface resistivity of $2\times10^{12}$ ohm.cm resulted in a residual potential of −440 volts causing a difficulty in surface charge-removal and a black-white potential difference of 3.8 volts which was insufficient for high-quality full-color electrophotographic image formation.

What is claimed is:

1. A transfer material-carrying member comprising a support and a white electroconductive coating layer formed on the support;

wherein said white electroconductive coating layer comprises a white pigment having a whiteness of at least 60, a white conductive material having a whiteness of at least 50 and a volume resistivity of at most $1\times10^{10}$ ohm.cm, and a binder; and exhibits a whiteness of at least 60 and a surface resistivity of at most $1\times10^{11}$ ohm/□.

2. A transfer material-carrying member according to claim 1, wherein said white electroconductive coating layer exhibits a reflectance of at least 75% at a wavelength in a region of 700–1500 nm.

3. A transfer material-carrying member according to claim 1, wherein said white pigment comprises white titanium oxide.

4. A transfer material-carrying member according to claim 1, wherein said white conductive material comprises white conductive titanium oxide.

5. A transfer material carrying member according to claim 1, wherein said electroconductive coating layer exhibits the whiteness of at least 60 and the surface resistivity of at most $1\times10^{11}$ ohm/□, when measured at a coating layer thickness of at least 5 $\mu$m.

* * * * *

UNITED STATES PATENT AND TRADEMARK OFFICE
CERTIFICATE OF CORRECTION

PATENT NO. : 5,824,408

DATED : October 20, 1998

INVENTORS : AKIYA KUME, ET AL.

It is certified that error appears in the above-identified patent and that said Letters Patent is hereby corrected as shown below:

On the title page, item [57] in the Abstract:

Line 7, "ohm/$cm^2$."ohm/□.--.

COLUMN 1,
Line 44, "transfer" should be deleted; and
Line 46, "case" should read --a case--; and "conductive," should read --conductive--.

COLUMN 4,
Line 25, "reference" should read --reflectance--;
Line 56, "a" should read --to a--; and
Line 64, "referred" should read --referred to--.

COLUMN 5,
Line 17, "an" should read --and--;
Line 43, "an" should read --a--; and
Line 61, "allows," should read --arrows--.

COLUMN 6,
Line 8, "are" should read --is--.

UNITED STATES PATENT AND TRADEMARK OFFICE

CERTIFICATE OF CORRECTION

PATENT NO. : 5,824,408

DATED : October 20, 1998

INVENTORS : AKIYA KUME, ET AL.

It is certified that error appears in the above-identified patent and that said Letters Patent is hereby corrected as shown below:

COLUMN 10,
Line 34, "ohm.cm" should read --ohm/□--.

Signed and Sealed this

Twentieth Day of July, 1999

Attest:

Q. TODD DICKINSON

Attesting Officer

*Acting Commissioner of Patents and Trademarks*